United States Patent [19]
Leone et al.

[11] Patent Number: 5,967,274
[45] Date of Patent: Oct. 19, 1999

[54] WRAP SPRING CLUTCH/BRAKE ASSEMBLY HAVING SOFT START AND SOFT STOP CAPABILITIES

[75] Inventors: Michael F. Leone, Sewell, N.J.; Russell K. Warner, Nesbit, Miss.

[73] Assignee: Dana Corporation, Toledo, Ohio

[21] Appl. No.: 08/955,863

[22] Filed: Oct. 21, 1997

[51] Int. Cl.$^6$ .................................................. F16D 13/08
[52] U.S. Cl. ..................... 192/35; 188/77 W; 192/52.1; 192/81 C; 192/84.81; 192/107 M
[58] Field of Search .............................. 192/84.81, 81 C, 192/52.1, 35, 107 M; 188/77 W

[56] References Cited

U.S. PATENT DOCUMENTS

| | | | |
|---|---|---|---|
| 2,523,772 | 9/1950 | McGibbon et al. | 192/81 C |
| 3,425,526 | 2/1969 | Baer . | |
| 3,451,512 | 6/1969 | Sacchini et al. . | |
| 3,521,730 | 7/1970 | Weatherby . | |
| 3,559,781 | 2/1971 | Brunnelle . | |
| 3,637,056 | 1/1972 | Baer . | |
| 3,735,847 | 5/1973 | Brucken | 192/81 CK |
| 3,865,222 | 2/1975 | Briar | 192/84.81 X |
| 4,059,176 | 11/1977 | Lowery et al. . | |
| 4,201,281 | 5/1980 | MacDonald | 192/35 |
| 4,460,076 | 7/1984 | Yamada | 192/84.81 X |
| 4,664,236 | 5/1987 | Stangroom | 192/48.3 X |
| 4,749,073 | 6/1988 | Olsen | 192/84.9 X |
| 4,830,184 | 5/1989 | Hays | 192/107 M X |
| 5,031,745 | 7/1991 | Nishimura | 192/84.81 |
| 5,090,530 | 2/1992 | Leone . | |
| 5,135,086 | 8/1992 | Ciolli . | |
| 5,335,760 | 8/1994 | Leone . | |

OTHER PUBLICATIONS

"Warp Spring Clutches and Brake" catalog, Warner Electric, dated May 1996.

*Primary Examiner*—Rodney H. Bonck
*Attorney, Agent, or Firm*—MacMillan, Sobanski & Todd, LLC

[57] ABSTRACT

A wrap spring operating mechanism for use in a random start/stop clutch, brake, or combined clutch/brake assembly limits the rate of acceleration or deceleration of the second member relative to the first member when the assembly is engaged. The assembly includes a first member, a second member, and a helical spring wrapped about adjacent portions of the first and second members. An annular control collar is disposed circumferentially about portions of the first and second members. The wrap spring has a first end that is connected to the first member and a second end that is connected to the control collar. An annular armature is connected to the control collar for rotational movement therewith and for relative axial movement. An annular rotor is disposed circumferentially about and connected to the second member. An annular friction ring is disposed within a recess formed in the rotor. The friction ring is formed from a material having a relatively low coefficient of friction, preferably about 0.2 or less under both wet and dry conditions. An electromagnetic coil assembly is provided for selective moving the armature into frictional engagement with the friction ring carried on the rotor to engage the assembly. By forming the friction ring from a non-magnetically permeable material having a relatively low coefficient of friction, the time duration of the frictional engagement of the armature with the friction plate is enlarged. As a result, the rate of acceleration or deceleration of the second member relative to the first member is limited to prevent undesirable impact loads from being generated, particularly when the assembly is operated at high speeds or when relatively large load are placed thereupon.

19 Claims, 2 Drawing Sheets

WRAP SPRING CLUTCH/BRAKE ASSEMBLY HAVING SOFT START AND SOFT STOP CAPABILITIES

BACKGROUND OF THE INVENTION

This invention relates in general to wrap spring operating mechanisms for use in clutch, brake, and combined clutch/brake assemblies to selectively connected first and second members together for concurrent movement. In particular, this invention relates to an improved structure for a wrap spring operating mechanism for use in such a clutch, brake, or combined clutch/brake assembly that limits the magnitude of acceleration or deceleration of the second member relative to the first member when the assembly is engaged.

Clutches are well known devices that are employed in wide variety of mechanical devices to selectively connect two members together for a desired purpose. A typical clutch structure includes a first member, a second member, and an operating mechanism for selectively connecting the first member to the second member. When the operating mechanism of the clutch is engaged, the first member is connected to the second member for concurrent movement. When the operating mechanism of the clutch is disengaged, the first member is disconnected from the second member to permit relative movement therebetween.

Clutches are frequently used in a driving mode, wherein the first member is connected to a source of rotational power and the second member is connected to a driven device. In these instances, when the operating mechanism of the clutch is engaged, the source of rotational power is connected through the clutch to rotatably drive the driven device. Conversely, when the operating mechanism of the clutch is disengaged, the source of rotational power is disconnected from the driven device to prevent such operation. Clutches are also frequently used in a braking mode, wherein the first member is connected to a stationary member and the second member is connected to a rotatable device. In these instances, when the operating mechanism of the clutch is engaged, the rotatable device is connected through the clutch to the stationary member so as to affirmatively brake the rotation thereof. Conversely, when the operating mechanism of the clutch is disengaged, the rotatable device is disconnected from the stationary member to allow such relative rotation. The above-described clutch and brake structures may be combined into a single clutch/brake assembly, wherein the second member is rotatably driven when the operating mechanism of the clutch/brake assembly is operated in a first mode and is affirmatively braked when the operating mechanism of the clutch/brake assembly is operated in a second mode.

One well known type of operating mechanism for clutch, brake, and combined clutch/brake assemblies is a wrap spring operating mechanism. A typical wrap spring operating mechanism includes a helical spring that is wrapped about adjacent cylindrical portions of the first and second members. The wrap spring has a relaxed inner diameter that is slightly smaller than the outer diameter of the portions of the first and second members upon which it is wrapped. Thus, when the first member is rotated in a first direction, the spring wraps down upon and frictionally engages the first and second members such that the second member is rotatably driven by the first member. When the first member is rotated in a second direction, the spring expands out of frictional engagement with the first and second members such that the second member is not rotatably driven by the first member. Wrap spring operating mechanisms can be used both for selectively driving a second member to be rotatably driven by a source of rotational power and for selectively braking a second member to prevent such rotation, as described above.

To control the engagement and disengagement of the wrap spring clutch efficiently, a control member may be provided for selectively controlling the expansion and contraction of the wrap spring (and, therefore, the operation of the wrap spring clutch assembly) in response to an external actuator. Typically, one end of the helical spring is secured to the first member for rotation therewith, while the other end of the spring is secured to the control member. The external actuator is provided for selectively engaging the control member to either permit or prevent rotation thereof relative to the first member. In this manner, the control member can be operated to either contract or expand the spring and, therefore, operate the wrap spring clutch assembly as desired.

In one known embodiment, the control member is an annular control collar having one or more outwardly-extending stops provided on the outer surface thereof that can be selectively engaged by a pivotable actuator. When the pivotable actuator is moved into engagement with one of the stops on the control collar, rotational movement of the control collar is prevented. When this occurs, the wrap spring is either expanded or contracted, thereby either releasing or engaging the second member for rotation with the first member. It will be appreciated that this type of operating mechanism permits engagement and disengagement of the assembly only at discrete rotational positions of the first and second members. In another known embodiment, the control member is an armature that is selectively movable into frictional engagement with the second member for rotation therewith. Typically, an electromagnet is provided for effecting movement of the armature into such frictional engagement. When the electromagnet is energized, the armature is frictionally engaged with the second member for rotation therewith, thereby causing the wrap spring to connect the second member for rotation with the first member. It can be seen that this type of operating mechanism permits engagement and disengagement of the assembly at any rotational position of the first and second members. Thus, wrap spring operated assemblies of this general type are commonly referred to as random start clutches when used in the above-described driving mode or random stop clutches when used in the above-described braking mode.

One of the significant advantages of wrap spring operated assemblies is that the time duration required to contract the wrap spring about the first and second members to effect engagement is very small, typically about three milliseconds or less. Unlike conventional friction-operated clutches, the engagement time duration for wrap spring operated clutches is essentially constant regardless of rotational speed or load placed thereupon. This advantage can, in some instances, present a problem when the clutch is operated at relatively high speeds or when a relatively large load is placed upon the clutch. In these instances, an undesirably large impact load may be placed upon the driven device when the clutch is engaged. This is because the driven device is very quickly accelerated (when the clutch is used to rotatably drive the second member) or decelerated (when the clutch is used to affirmatively brake the second member) when the wrap spring operating mechanism is engaged. This rapid acceleration or deceleration can result in an undesirably large impact load being applied to the driven device or other portions of the system, especially when the clutch is operated at relatively high speeds or when a relatively large load is placed upon the clutch. These impact loads can result in premature wear or damage. Thus, it would be desirable to provide an improved structure for a wrap spring operating mechanism for use in a random start/stop clutch, brake, or combined clutch/brake assembly that limits the rate of acceleration or deceleration of the second member relative to the first member when the assembly is engaged.

SUMMARY OF THE INVENTION

This invention relates to an improved structure for a wrap spring operating mechanism for use in a random start/stop clutch, brake, or combined clutch/brake assembly that limits the rate of acceleration or deceleration of the second member relative to the first member when the assembly is engaged. The assembly includes a first member, a second member, and a helical spring wrapped about adjacent portions of the first and second members. An annular control collar is disposed circumferentially about portions of the first and second members. The wrap spring has a first end that is connected to the first member and a second end that is connected to the control collar. An annular armature is connected to the control collar for rotational movement therewith and for relative axial movement. An annular rotor is disposed circumferentially about and connected to the second member. An annular friction ring is disposed within a recess formed in the rotor. The friction ring is formed from a material having a relatively low coefficient of friction, preferably about 0.2 or less under both wet and dry conditions. An electromagnetic coil assembly is provided for selective moving the armature into frictional engagement with the friction ring carried on the rotor to engage the assembly. By forming the friction ring from a non-magnetically permeable material having a relatively low coefficient of friction, the time duration of the frictional engagement of the armature with the friction plate is enlarged. As a result, the rate of acceleration or deceleration of the second member relative to the first member is limited to prevent undesirable impact loads from being generated, particularly when the assembly is operated at high speeds or when relatively large load are placed thereupon.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
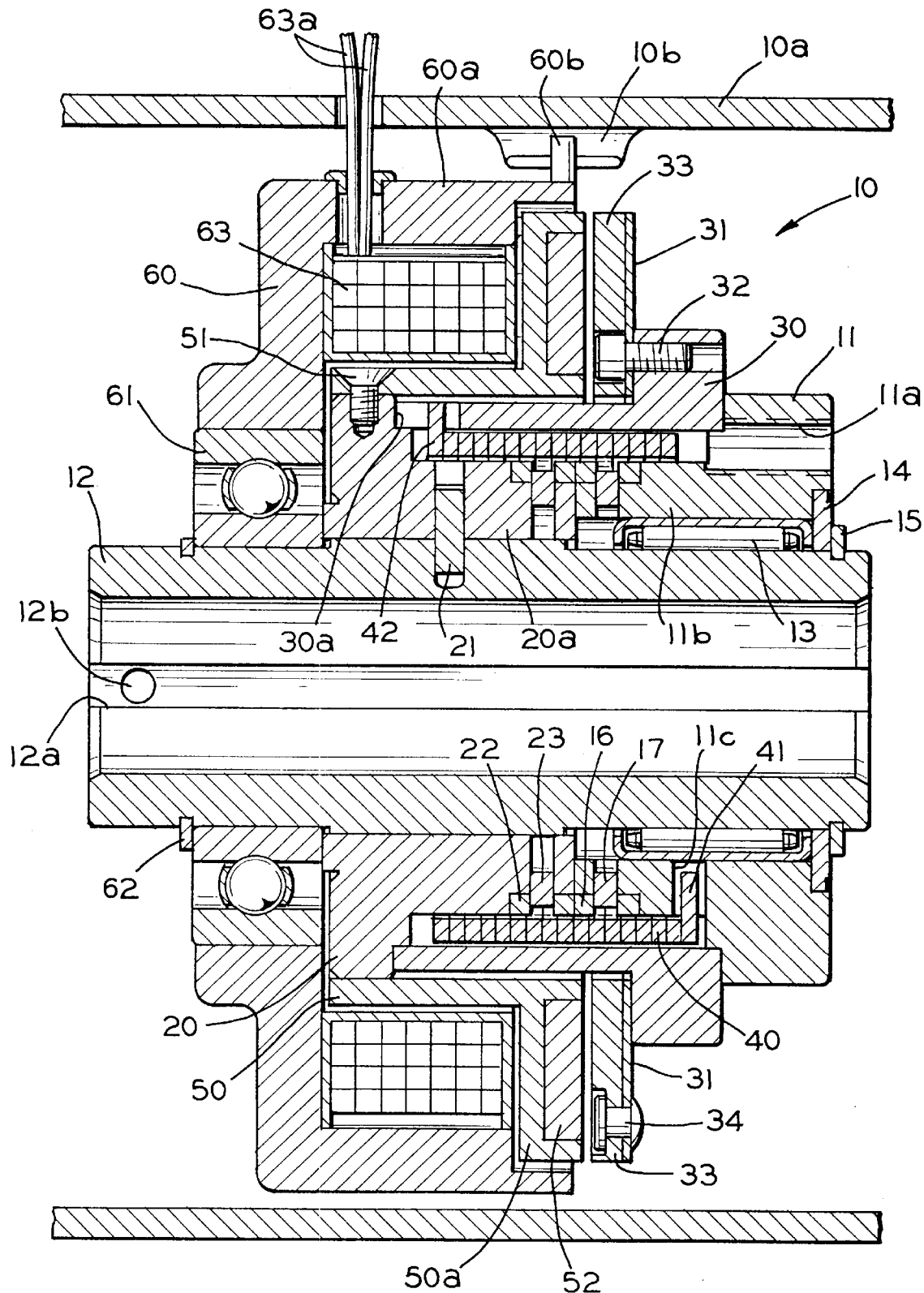
FIG. 1 is a sectional elevational view of a wrap spring clutch assembly adapted to operate in a driving mode in accordance with this invention.

Referring now to the drawings, there is illustrated in FIG. 1 a wrap spring clutch assembly, indicated generally at 10, in accordance with this invention. The basic structure and mode of operation of the wrap spring clutch assembly 10 is well known in the art, and only those portions of the assembly 10 that are necessary for a complete understanding of the invention will be described. The assembly 10 may be supported and enclosed within a rigid housing, a portion of which is illustrated at 10*a,* in a conventional manner to enclose and seal the various components thereof from the exterior environment. The assembly 10 includes a first member (referred to in this embodiment as an input hub) 11 that is rotatably supported on a second member (referred to in this embodiment as an output shaft) 12 by a plurality of roller bearings 13 or other similar structure. The input hub 11 may have one or more threaded apertures 11*a* formed therein to facilitate the connection of an external device (not shown) thereto, such as a motor or other source of rotational power. Similarly, the output sleeve 12 may be formed having a longitudinally extending key 12*a* and a radially extending threaded set screw 12*b* for facilitating the connection of an external device (not shown), such as a conveyor or other rotatably driven device.

The input hub 11 is generally cylindrical in shape, having an axially-extending portion 11*b* that is rotatably supported by the bearings 13 on the output sleeve 12. A slot 11*c* is formed in the input hub 11 for a purpose that will be explained below. The input hub 11 is restrained from axial movement in a first axial direction (toward the right when viewing FIG. 1) by a thrust washer 14 that is retained on the output sleeve 12 by a retaining ring 15. The retaining ring 15 is disposed in an annular groove formed in the outer surface of the output sleeve 12 to restrain the thrust washer 14 and the input hub 11 from movement in the first axial direction. A relatively small hollow cylindrical wear ring 16 is secured to the axially extending portion 11*b* of the input hub 11 by one or more pins 17 or by any other conventional retaining structure. The wear ring 16 is located at or near the end of the axially extending portion 11*b* of the input hub 11 and is formed from a relatively hard or high strength material. The purpose of the wear ring 16 will be explained below.

The input hub 11 is restrained from axial movement in a second axial direction (toward the left when viewing FIG. 1) by abutment with an output hub 20. The output hub 20 is also generally cylindrical in shape, having an axially extending portion 20*a* that is secured to the output sleeve 12 for concurrent rotation by a pin 21 or other suitable fastener. Thus, the pin 21 restrains the output hub 20 from movement in either axial direction. However, any other conventional structure may be provided for connecting the output hub 20 to the output sleeve 12 and for preventing relative axial movement therebetween. A relatively small hollow cylindrical wear ring 22 is secured to the axially extending portion 20*a* of the output hub 20 by a one or more pins 23 or by any other conventional retaining structure. The wear ring 22 is located at or near the end of the axially extending portion 20*a* of the output hub 20 (preferably adjacent the wear ring 16) and is formed from a relatively hard or high strength material. The purpose of the wear ring 22 will be explained below.

An annular control collar 30 is disposed circumferentially about portions of the input hub 11 and the output hub 20. The control collar 30 is restrained from movement in a first axial direction (toward the right when viewing FIG. 1) by abutment with the input hub 11. Similarly, the control collar 30 is restrained from movement in a second axial direction (toward the left when viewing FIG. 1) by abutment with the output hub 20. However, the control collar 30 is not mechanically restrained to rotate with either the input hub 11 or the output hub 20. A slot 30*a* is formed in the control collar 30 for a purpose that will be explained below. One or more return springs 31 are secured to the control collar 30 by threaded fasteners 32 (only one of which is shown) or other conventional fasteners. The return springs 31 are, in turn, connected to an armature plate 33 by a plurality of rivets 34 (only one of which is shown) or other conventional fasteners.

As shown in FIG. 1, the ends of the axially extending portions 11b and 20a of the input hub 11 and the output hub 20, respectively, are disposed adjacent one another. A helical wrap spring 40 is disposed about these adjacent axially extending portions 11b and 20a of the input hub 11 and the output hub 20. The wrap spring 40 has a first control tang 41 provided on a first end thereof (the right end when viewing FIG. 1) that extends radially inwardly into the slot 11c formed in the input hub 11. The wrap spring 40 has a second control tang 42 provided on a second end thereof (the left end when viewing FIG. 1) that extends radially outwardly into the slot 30a formed in the control collar 30. The operation of the wrap spring 40 will be explained below.

An annular rotor 50 is disposed circumferentially about the output hub 20. The rotor 50 includes a hollow cylindrical portion that is connected to the output hub 20 by a threaded fastener 51 or any other conventional structure. Thus, the rotor 50 is connected for rotation with the output hub 20. The rotor 50 further includes an annular flange portion 50a that extends radially outwardly from the cylindrical portion thereof. An annular friction member, such as a friction ring 52, is disposed within a recess formed in the flange portion 50a of the rotor 50. The friction ring 52 is secured to the flange portion 50a of the rotor 50 by any conventional means. The structure and function of the friction ring 52 will be explained below.

A non-rotatable shell 60 is supported on the output sleeve 12 by a ball bearing 61 or other similar structure. The ball bearing 61 is restrained from movement in a first axial direction along the output sleeve 12 (toward the right when viewing FIG. 1) by abutment with the output hub 20. The ball bearing 61 is restrained from movement in a second axial direction along the output sleeve 12 (toward the left when viewing FIG. 1) by a retaining ring 62 disposed in a grooved formed in the outer surface of the output sleeve 12. The shell 60 is generally cup-shaped, having an axially-extending portion 60a that terminates in an anti-rotation tab 60b. The anti-rotation tab 60b is conventional in the art and is adapted to engage an inwardly extending protrusion 10b formed on the rigid housing 10 or other stationary structure to prevent the shell 60 from rotating during operation of the assembly 10. The axially extending portion 60a of the shell 60 extends about and encloses the rotor 50 and the output hub 20. The shell 60 also encloses a conventional electromagnetic coil assembly 63 including a pair of lead wires 63a that extend outwardly from the assembly 10 to a source of electrical energy (not shown). Thus, as is well known in the art, the electromagnetic coil assembly 63 can be selectively energized to generate an electromagnetic field.

Normally, the electromagnetic coil assembly 63 is de-energized and, therefore, does not generate the electromagnetic field. In this mode of operation, the return spring 31 is effective to maintain the armature 33 axially spaced apart from the radially extending flange portion 50a of the rotor 50. As a result, the input hub 11, the wrap spring 40, the control collar 30, and the armature 33 are free to rotate relative to the output hub 20. In this condition, the wrap spring 40 is not frictionally engaged with the input hub 11 and the output hub 20. Thus, the output hub 20 is not connected for movement with the input hub 11. The armature 33 and the rotor 50 are both formed from a magnetically permeable material. Thus, when the electromagnetic coil assembly 63 is energized, the resultant electromagnetic field attracts the armature 33 to be moved axially toward the radially extending flange portion 50a of the rotor 50, against the urging of the return spring 31. When the armature 33 frictionally engages the friction pad 52 carried on the radially extending flange portion 50a of the rotor 50, the control collar 30 is constrained to rotate with the output hub 20. As a result, the wrap spring 40 contracts about the axially extending portions 11b and 30a of the input and output hubs 11 and 30, respectively, to connect the output hub 20 for movement with the input hub 11. The hardened wear rings 16 and 22 are provided on the axially extending portions 11b and 30a of the input and output hubs 11 and 30, respectively, to prevent damage thereto from repeated engagements of the wrap spring 40.

The friction ring 52 carried on the rotor 50 is designed to provide a predetermined coefficient of friction between it and the armature 33 when the electromagnetic coil assembly 63 is energized as described above. As used herein, the coefficient of friction between two surfaces is equal to the magnitude of force required to move one surface relative to the other surface divided by the magnitude of the total force urging the two surfaces into engagement with one another. The friction ring 52 is preferably formed from a non-magnetically permeable material having a relatively low coefficient of friction. Preferably, the coefficient of friction between the armature 33 and the friction ring 52 is approximately 0.2 or less, under both wet (e.g., when the components of the wrap spring clutch assembly 10 are immersed in oil) and dry conditions. This can be accomplished by forming the friction ring 52 from a bearing material, such as bronze. For example, the friction ring 52 may be formed from a bronze alloy containing about 90% to 95% copper and about 5% to 10% tin. One suitable bronze alloy that is commercially available is CT-0010-S bronze, which contains about 90% copper and 10% tin. Alternatively, the friction ring 52 may be impregnated with oil or other lubricating fluid to provide the desired coefficient of friction at about 0.2 or less. Other non-magnetic bearing materials may be also suitable, such as a graphite based compound.

By forming the friction ring 52 from a material having a relatively low coefficient of friction, the armature 33 will initially slip relative to the rotor 50 when the electromagnetic coil assembly 63 is energized. This slipping of the armature 33 relative to the friction ring 52 slows the contraction of the wrap spring 40 about the cylindrical portions 11b and 20a of the input and output hubs 11 and 20, respectively. Thus, the time duration for complete engagement of the assembly 10 is extended slightly, from about three milliseconds as described above to about nine to twelve milliseconds. This delay allows a greater amount of time for the rotational speeds of the input and output hubs 11 and 20, respectively, to synchronize. As a result, the impact load generated by engagement of the assembly 10 will be sufficiently decreased to prevent undesirable wear or damage from occurring, even when the assembly 10 is operated at relatively high speeds or when a relatively large load is placed upon the assembly 10.

The use of a non-magnetically permeable material for the friction ring 52 is preferred so that the friction ring 52 also functions as a flux break to insure rapid disengagement of the armature 33 from the rotor 50 when the electromagnetic coil assembly 63 is de-energized. When electromagnetic coil assemblies 63 of this type are used, residual magnetism induced within the armature 33 may result in a slight magnetic attraction between the armature 33 and the rotor 50 even after the electromagnetic coil assembly 63 has been de-energized. Such residual magnetism can inhibit the free movement of the armature 33 relative to the rotor 50, thereby increasing the amount of time required to disengage the assembly 10 when the electromagnetic coil assembly 63 is de-energized. By forming the friction ring 52 from a non-magnetically permeable material, the effects of this residual magnetism are significantly reduced. First, the use of the non-magnetically permeable material in the friction ring 52 helps to prevent the armature 33 from becoming permanently magnetized by the electromagnetic coil assembly 63, thereby reducing the occurrence of this residual magnetism. Second, even when the armature 33 becomes permanently magnetized, the use of the non-magnetically permeable material in the friction ring 52 helps to prevent the armature 33 from being attracted to the rotor 50. Thus, the armature 33 is free to move away from the rotor 50 under the urging of the return spring 31 when the electromagnetic coil assembly 63 is de-energized.

Although the wrap spring clutch assembly 10 has been described in the context of the input member 11 being driven by a source of rotational energy and selectively connected to drive the output member 20, it will be appreciated that the wrap spring clutch assembly 10 may be used in the reverse manner. Thus, this invention may be practiced in a wrap spring clutch assembly 10 wherein the output member 20 is driven by a source of rotational energy and is selectively connected to drive the input member 11.

Figure 2:
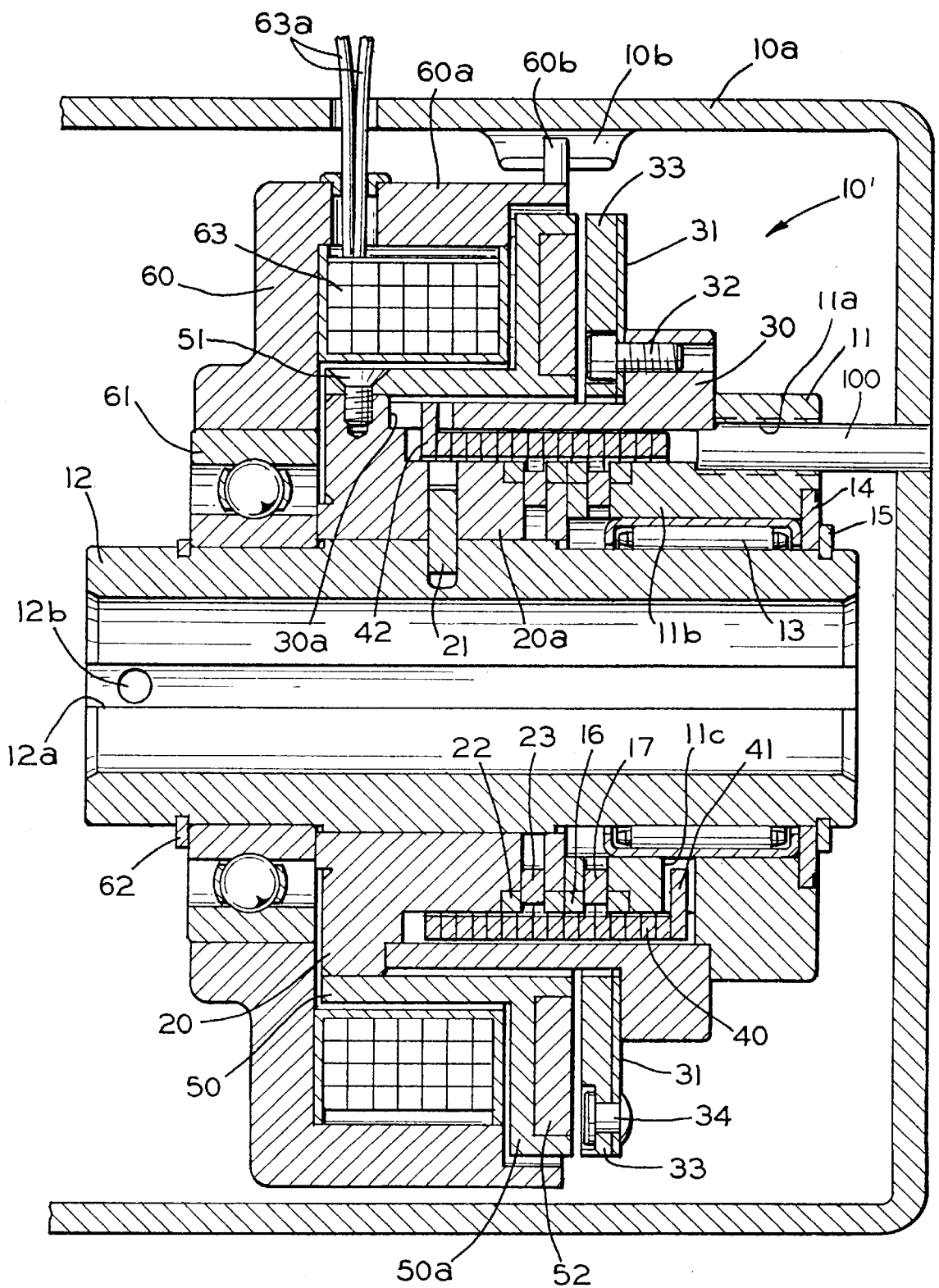
FIG. 2 is a sectional elevational view of a wrap spring clutch assembly adapted to operate in a braking mode in accordance with this invention.

Referring now to FIG. 2, there is illustrated a wrap spring brake assembly, indicated generally at 10', in accordance with this invention. The basic structure and mode of operation of the wrap spring brake assembly 10' is identical to the wrap spring clutch assembly 10 described above, and like reference numbers are used to designate identical components. In the wrap spring brake assembly 10', the first member 11 is connected to a portion of the rigid housing 10a by a stud 100 or other conventional means. As a result, the first member 11 is prevented from rotating. When the electromagnetic coil assembly 63 is energized, the wrap spring 40 contracts about the cylindrical portions 11b and 20a to connect the first member 11 to the second member 20. As a result, rotation of the second member 20 is affirmatively braked. As mentioned above, the wrap spring clutch assembly 10 and the wrap spring brake assembly 10' may be combined into a single wrap spring clutch/brake assembly if desired.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A wrap spring clutch assembly comprising:
   a first member;
   a second member;
   a wrap spring disposed about portions of said first and second members;
   an operating mechanism for selectively causing said wrap spring to frictionally engage said portions of said first and second members, said operating mechanism including a friction member connected to one of said first and second members for rotation therewith, an armature connected to said wrap spring, and an actuator for selectively causing said friction member and said armature to frictionally engage one another at a coefficient of friction of approximately 0.2 or less, said friction member being formed from a non-magnetically permeable material.

2. The wrap spring clutch assembly defined in claim 1 wherein said operating mechanism includes a rotor connected to said second member for rotation therewith, and wherein said friction member is carried on said rotor.

3. The wrap spring clutch assembly defined in claim 1 wherein said operating mechanism includes a control collar connected to said wrap spring, and wherein said armature is connected to said control collar.

4. The wrap spring clutch assembly defined in claim 1 wherein said actuator includes an electromagnetically actuated coil for selectively causing said friction member and said armature to frictionally engage one another.

5. The wrap spring clutch assembly defined in claim 4 wherein said electromagnetically actuated coil selectively causes armature to move into frictional engagement with said friction member.

6. The wrap spring clutch assembly defined in claim 1 wherein said friction member and said armature frictionally engage one another at a coefficient of friction of approximately 0.2 or less under both wet and dry conditions.

7. The wrap spring clutch assembly defined in claim 1 wherein said friction material is impregnated with a lubricating fluid.

8. The wrap spring clutch assembly defined in claim 1 wherein said friction material is a graphite based compound.

9. The wrap spring clutch assembly defined in claim 1 further including a housing that encloses said first member, said second member, said wrap spring, and said operating mechanism.

10. A wrap spring clutch assembly comprising:
    a first member;
    a second member;
    a wrap spring disposed about portions of said first and second members;
    an operating mechanism for selectively causing said wrap spring to frictionally engage said portions of said first and second members, said operating mechanism including a friction member connected to one of said first and second members for rotation therewith, an armature connected to said wrap spring, and an actuator for selectively causing said friction member and said armature to frictionally engage one another at a coefficient of friction of approximately 0.2 or less, said friction member being formed from a bronze alloy.

11. The wrap spring clutch assembly defined in claim 10 wherein said operating mechanism includes a rotor connected to said second member for rotation therewith, and wherein said friction member is carried on said rotor.

12. The wrap spring clutch assembly defined in claim 10 wherein said operating mechanism includes a control collar connected to said wrap spring, and wherein said armature is connected to said control collar.

13. The wrap spring clutch assembly defined in claim 10 wherein said actuator includes an electromagnetically actuated coil for selectively causing said friction member and said armature to frictionally engage one another.

14. The wrap spring clutch assembly defined in claim 13 wherein said electromagnetically actuated coil selectively causes armature to move into frictional engagement with said friction member.

15. A wrap spring clutch assembly comprising:
    a first member;
    a second member;
    a wrap spring disposed about portions of said first and second members;
    an operating mechanism for selectively causing said wrap spring to frictionally engage said portions of said first and second members, said operating mechanism including a friction member connected to one of said first and second members for rotation therewith, an armature connected to said wrap spring, and an actuator for selectively causing said friction member and said armature to frictionally engage one another at a coefficient of friction of approximately 0.2 or less under both wet and dry conditions.

16. The wrap spring clutch assembly defined in claim 15 wherein said operating mechanism includes a rotor connected to said second member for rotation therewith, and wherein said friction member is carried on said rotor.

17. The wrap spring clutch assembly defined in claim 15 wherein said operating mechanism includes a control collar connected to said wrap spring, and wherein said armature is connected to said control collar.

18. The wrap spring clutch assembly defined in claim 15 wherein said actuator includes an electromagnetically actuated coil for selectively causing said friction member and said armature to frictionally engage one another.

19. The wrap spring clutch assembly defined in claim 18 wherein said electromagnetically actuated coil selectively causes armature to move into frictional engagement with said friction member.

* * * * *